Aug. 9, 1960
F. MEYER
2,948,152
ACCELEROMETER
Filed Dec. 27, 1956
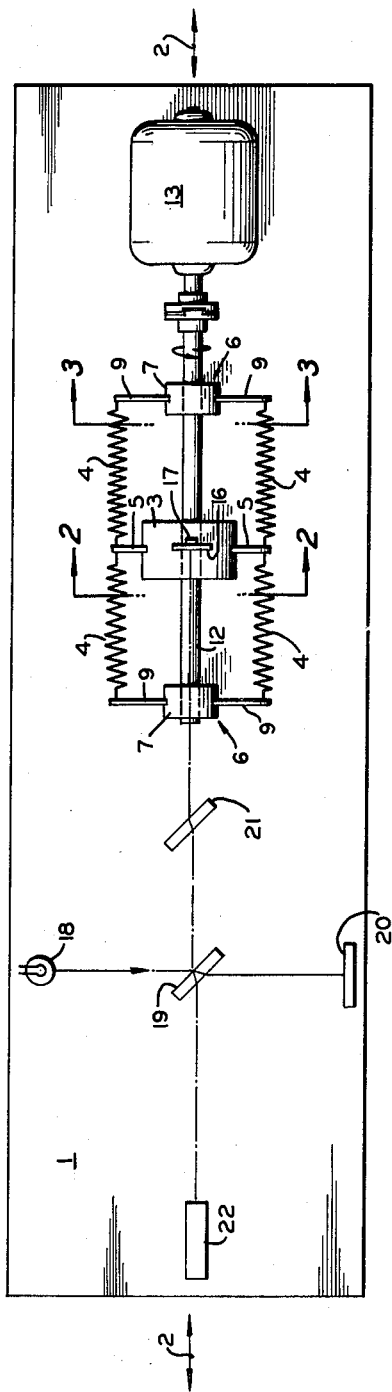
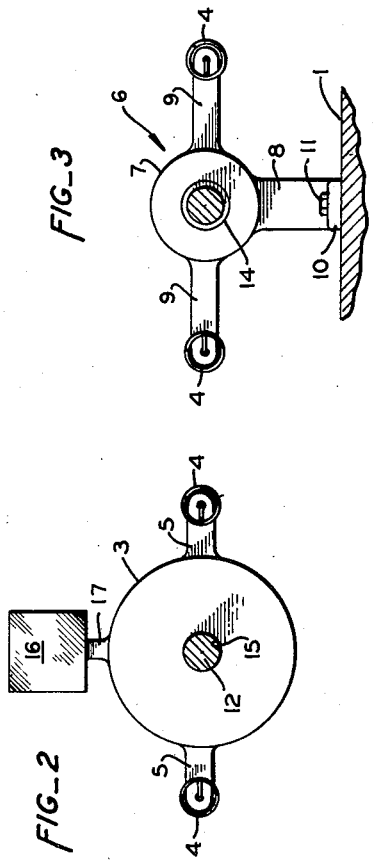
INVENTOR.
FRANKLIN MEYER
BY *Carl Hoppe*
ATTORNEY

United States Patent Office 2,948,152
Patented Aug. 9, 1960

2,948,152

ACCELEROMETER

Franklin Meyer, Franklin Square, N.Y., assignor to Servo-mechanisms, Inc., Hawthorne, Calif., a corporation of New York Filed Dec. 27, 1956, Ser. No. 630,833

2 Claims. (Cl. 73—514)

This invention relates to an accelerometer for detecting and measuring the acceleration of a moving vehicle, and is useful for all forms of vehicles, including airplanes, rockets, guided missiles and ships.

The primary object of this invention is to provide an accelerometer which is sensitive to acceleration in a defined direction, but which is relatively insensitive to cross accelerations.

An additional object of the invention is to provide an accelerometer in which the output information can be integrated accurately and easily.

A further object of this invention is to provide an accelerometer which produces digital output information.

The foregoing and other objects and advantages of this invention will be come apparent to those skilled in the art upon an understanding of an illustrative embodiment of this invention.

The illustrative embodiment of this invention provides a seismic mass suspended from a plurality of helical quartz springs. In order to eliminate friction and still to restrict the movement of the mass to displacements along the sensitive axis only, the mass is supported by air bearings of the simple dynamic journal bearing type. The seismic mass thus supported is provided with a surface having an optical flat which forms the movable mirror of a Michelson interferometer. In the operation of the specific embodiment of this invention, acceleration in the defined direction produces a displacement of the mirror which is transformed to a fringe count output by the optical system.

The illustrative embodiment of this invention is shown in the accompanying drawings, in which—

Fig. 1 is a top plan view of the illustrative form of this invention;

Fig. 2 is a vertical cross-sectional view taken on the line 2—2 of Fig. 1; and

Fig. 2 is a vertical cross-sectional view taken on the line 3—3 of Fig. 1.

The illustrative embodiment of this invention is provided with a platform 1 which is secured rigidly to the vehicle, the acceleration of which is to be measured, with the longitudinal axis 2 of the platform in parallelism with the defined axis of the vehicle along which it is desired to measure acceleration.

There is suspended above the platform 1 a seismic mass 3. This seismic mass is suspended for forward and reverse motion along an axis parallel with the longitudinal axis of the accelerometer by means of four helical quartz springs 4. In the illustrative embodiment, the seismic mass is formed in the shape of a cylinder and it is provided with two brackets which extend outwardly from the mass and which provide means for securing one end of each of the helical quartz springs 4 to the seismic mass 3.

The other end of each pair of the helical quartz springs 4 is rigidly secured with respect to the platform 1 upon each of two supports 6. Each of these supports 6 is provided with a body portion 7, a stem portion 8 depending downwardly from the body portion 7 and spring mounting brackets 9 extending outwardly from the body portion 7. The stem 8 of each support 6 is secured to the platform 1 by means of a flange 10 and a screw 11 passing through the flange 10 into the platform 1 and securing it to the platform. The spring mounting brackets 9 extend outwardly from the body portion 6 and provide means for supporting the stationary ends of each of the helical quartz springs 4.

Means are provided to eliminate friction and still to restrict the movement of the mass to displacements along the sensitive axis only. In the illustrative embodiment, these means comprise an air bearing of the simple dynamic journal bearing type for supporting the mass. More specifically, the seismic mass 3 is mounted upon a rotating shaft 12 driven from a synchronous motor 13 which is secured upon the platform 1. This rotating shaft 12 is carried by bearings 14 bored through the body portions 7 of the supports 6. The seismic mass 3 in turn is provided with a bore 15 through which the rotating shaft 12 passes. The tolerance between the bore 15 and the rotating shaft 12 forms an air bearing which eliminates friction and still restricts the movement of the mass to displacements along the sensitive axis only.

Means are provided for measuring the diplacement of the seismic mass back and forth along its longitudinal axis. In the illustrative embodiment, the seismic mass forms the movable mirror of a Michelson interferometer, a device well known to those skilled in the art. Reference is here made to the Encyclopedia Britannica, 1952 Edition, volume 12, pp. 469–470, for general information as to the structure and mode of operation of a Michelson interferometer.

As illustrated, a mirror 16 is ground to an optical flat and is secured to a bracket 17 which extends upwardly from the seismic mass 3. The other elements of the Michelson interferometer are mounted upon the platform 1. These elements include a light source 18, a beam splitter 19, a fixed mirror 20, a compensating plate 21 and a telescopic lens 22. The beam splitter 19 comprises a plane-parallel glass plate disposed at an angle of 45° with respect to the light source 18 and the mirror 16. The surface of the beam splitter 19 is covered with a film of silver or platinum of such thickness that pencils of light are both reflected from the surface and transmitted through the surface and are both of approximately equal intensity. The reflected beam falls normally upon the mirror 16 and the transmitted beam fall normally upon the fixed mirror 20 mounted upon the platform 1. Both pencils of light return to and pass through the beam splitter 19 and are recombined. This results in a plurality of generally-parallel and usually-curved alternate colored and white lines called interference fringes. Since the beam reflected from the fixed mirror 20 has had to pass three times through the beam splitter 19, whereas the beam from the mirror 16 passes through the beam splitter only once, the compensating plate 21 is interposed between the fixed mirror 16 and the beam splitter 19.

The interference fringes resulting as aforesaid are viewed through a telescopic lens 22. As the mirror 16 moves in one direction, the fringes will move in one direction, and as the mirror moves in the opposite direction, the fringes will move in the opposite direction. The number of fringes passing a given point in the viewing telescope are directly proportional to the distance which the mirror is displaced.

As a consequence, since acceleration is a function of the change of velocity per unit of time, and since the seismic mass will be displaced along its axis in response to changes in the velocity of the device, one need only count the number of fringes passing a given point in the viewing telescope in a given unit of time to determine the rate of acceleration. This result produces the digital information which is so desired in instruments of this type.

Although the illustrative embodiment of this invention has been shown in connection with a visual count by an operator of the device, it will become readily apparent to those skilled in the art that the resulting interference fringes may be projected upon photoelectric cells and that the counting may be done mechanically by the use of electronic counting apparatus.

The foregoing detailed description has been given for clearness of understanding only, and no unnecessary limitation should be understood therefrom, for modifications will be obvious to those skilled in the art.

I claim:

1. An accelerometer for detecting and measuring acceleration along a defined axis comprising a rotating shaft having an axis of rotation along said defined axis; a seismic mass supported on said rotating shaft; an air bearing between said seismic mass and said rotating shaft; means restricting the movement of the seismic mass upon said rotating shaft to displacements along the sensitive axis only; and means for measuring the displacement of said seismic mass along said defined axis.

2. An accelerometer for detecting and measuring acceleration along a defined axis comprising a rotating shaft having an axis of rotation along said defined axis; a seismic mass supported on said rotating shaft; an air bearing between said seismic mass and said rotating shaft; means restricting the movement of the seismic mass upon said rotating shaft to displacements along the sensitive axis only; and a Michelson interferometer having a fixed source of light, a fixed mirror, and a movable mirror; the movable mirror of said Michelson interferometer being integral with said seismic mass; and means for determining the passage of interference fringes with respect to the displacement of said seismic mass and movable mirror.

References Cited in the file of this patent

UNITED STATES PATENTS

| | | |
|---|---|---|
| 1,625,625 | Ricker | Apr. 19, 1927 |
| 2,332,994 | Draper et al. | Oct. 26, 1943 |
| 2,591,921 | Cosgriff et al. | Apr. 8, 1952 |
| 2,840,366 | Wing | June 24, 1958 |

FOREIGN PATENTS

| | | |
|---|---|---|
| 46,402 | Austria | Feb. 10, 1911 |

OTHER REFERENCES

Lubrication Eingineering, "Air Bearings," pages 298–301, vol 9, No. 6, December 1953.

Disclaimer 2,948,152.—*Franklin Meyer*, Franklin Square, N.Y. ACCELEROMETER. Patent dated Aug. 9, 1960. Disclaimer filed Dec. 28, 1962, by the assignee, *Servomechanisms, Inc.*

Hereby enters this disclaimer to claim 1 of said patent.

[*Official Gazette January 29, 1963.*]